US012608867B2

(12) United States Patent
Serrat et al.

(10) Patent No.: US 12,608,867 B2
(45) Date of Patent: Apr. 21, 2026

(54) SYSTEM AND METHOD FOR GENERATING A MODEL OF THE HUMAN BODY

(71) Applicant: SQUAREMIND, Paris (FR)

(72) Inventors: Tanguy Serrat, Saint-Cloud (FR); Ali Khachlouf, Paris (FR)

(73) Assignee: SQUAREMIND, Paris (FR)

( * ) Notice: Subject to any disclaimer, the term of this patent is extended or adjusted under 35 U.S.C. 154(b) by 320 days.

(21) Appl. No.: 18/245,926

(22) PCT Filed: Sep. 22, 2021

(86) PCT No.: PCT/EP2021/076124
§ 371 (c)(1),
(2) Date: Mar. 20, 2023

(87) PCT Pub. No.: WO2022/063862
PCT Pub. Date: Mar. 31, 2022

(65) Prior Publication Data
US 2023/0386117 A1 Nov. 30, 2023

(30) Foreign Application Priority Data
Sep. 23, 2020 (FR) ...................................... 2009676

(51) Int. Cl.
*G06T 13/40* (2011.01)
*G06N 3/08* (2023.01)
*G06T 17/20* (2006.01)

(52) U.S. Cl.
CPC ............... *G06T 13/40* (2013.01); *G06N 3/08* (2013.01); *G06T 17/20* (2013.01)

(58) Field of Classification Search
CPC ......... G06T 13/40; G06T 17/20; G06T 17/00; G06N 3/08
See application file for complete search history.

(56) References Cited

U.S. PATENT DOCUMENTS

| | | | |
|---|---|---|---|
| 9,189,886 B2 | 11/2015 | Black et al. | |
| 10,636,193 B1 | 4/2020 | Sheikh et al. | |
| 11,158,121 B1 * | 10/2021 | Tung ...................... | G06N 3/045 |
| 2008/0180448 A1 * | 7/2008 | Anguelov ............... | G06T 13/40 |
| | | | 345/475 |

(Continued)

FOREIGN PATENT DOCUMENTS

| | | |
|---|---|---|
| KR | 10-2004-0081255 A | 9/2004 |
| WO | WO 2019/219357 A1 | 11/2019 |
| WO | WO 2020/141468 A1 | 7/2020 |

OTHER PUBLICATIONS

International Search Report as issued in International Patent Application No. PCT/EP2021/076124, dated Apr. 11, 2022.

(Continued)

*Primary Examiner* — Jitesh Patel
(74) *Attorney, Agent, or Firm* — CUSHMAN PARTNERS, LLC

(57) ABSTRACT

A method for generating a human body model includes acquiring at least one partial view of an individual defining a 3D image from at least one optical device arranged in a position of space, and generating a human body model by applying a trained neural network to generate a 3D model of the individual body from input 3D images, the training of the neural network being performed from a set of data describing partial views of the human body.

21 Claims, 6 Drawing Sheets

(56) References Cited

U.S. PATENT DOCUMENTS

| | | | |
|---|---|---|---|
| 2010/0111370 | A1 | 5/2010 | Black |
| 2011/0273442 | A1 | 11/2011 | Drost |
| 2018/0096533 | A1 | 4/2018 | Osman |
| 2018/0181802 | A1* | 6/2018 | Chen ..................... G06V 10/764 |
| 2019/0213388 | A1* | 7/2019 | Makeev ................. G06V 10/82 |
| 2019/0295278 | A1* | 9/2019 | Kim ...................... G06T 11/001 |
| 2020/0178807 | A1* | 6/2020 | Farahbakhshian .......................... A61B 5/02116 |
| 2021/0012558 | A1 | 1/2021 | Li |
| 2021/0049811 | A1* | 2/2021 | Fedyukov ................ G06T 7/60 |
| 2022/0245911 | A1* | 8/2022 | Hu .......................... G06T 19/20 |

OTHER PUBLICATIONS

Schöning, J., et al., "Image-based 3D Reconstruction: Neural Networks vs. Multiview Geometry," 2018 IEEE International Conference on Image Processing, Applications and Systems (/PAS), IEEE, Dec. 2018 (Dec. 12, 2018), XP033547058, pp. 91-97.

Huang, Z., et al., "Deep Volumetric Video From Very Sparse Multi-view Performance Capture," Advances in Databases and Information Systems; [Lecture Notes in Computer Science; Lect. Notes Computer]. Oct. 2018, XP047497230, pp. 351-369.

Sajó, L., et al., "A 3D Head Model From Stereo Images by a Self-organizing Neural Network," JournaljcJr Geometry and Graphics Volume, Jan. 2009 (Jan. 1, 2009), Retrieved from the Internet: https://citeseerx.ist.psu.edu/viewdoc/download?doi=10.1.1.711.3145&rep=rep1&type=pdf, [retrieved on Jun. 4, 2021], XP055810596, pp. 209-220.

Ji, M., et al., "SurfaceNet: An End-to-end 3D Neural Network for Multiview Stereopsis," arxiy.org, Cornell University Library, 201 Olin Library Cornell, Aug. 2017, XP081661879, pp. 1-9.

Kanazawa, A., et al., "End-to-End Recovery of Human Shape and Pose," 2018 JEEEICVF Conference on Computer Vision and Pattern Recognition, Jun. 2018, XP033473631, pp. 7122-7131.

Jiang, H., et al., "Skeleton-Aware 3D Human Shape Reconstruction From Point Clouds," 2019 IEEEICVF International Conference on Computer Vision (/CCV), IEEE, Oct. 2019, XP033723110, pp. 5430-5440.

Groueix, T., et al., "3d-coded: 3d correspondences by deep deformation," In Proceedings of the European Conference on Computer Vision (ECCV) (pp. 230-246). (Year: 2018).

Joo, H., et al., "Total capture: A 3d deformation model for tracking faces, hands, and bodies," Proceedings of the IEEE conference on computer vision and pattern recognition (Year: 2018).

Wan, C., et al., "Hand pose estimation from local surface normal," European conference on computer vision. Springer, Cham (Year: 2016).

Bronstein, M., et al., "Scale-invariant heat kernel signatures for non-rigid shape recognition," 2010 IEEE computer society conference on computer vision and pattern recognition, IEEE (Year: 2010).

Campbell, R., et al., "A survey of free-form object representation and recognition techniques." Computer Vision and Image Understanding 81.2 (2001): 166-210. (Year: 2001).

Madadi, M., et al., "Human segmentation, pose estimation and applications," Universitat Autonoma de Barcelona; 2017, Chapter 2, p. 11-42. (Year: 2017).

* cited by examiner

MOD_S

SYSTEM AND METHOD FOR GENERATING A MODEL OF THE HUMAN BODY

CROSS-REFERENCE TO RELATED APPLICATIONS

This application is the U.S. National Stage of PCT/EP2021/076124, filed Sep. 22, 2021, which in turn claims priority to French patent application number 2009676 filed Sep. 23, 2020. The content of these applications are incorporated herein by reference in their entireties.

FIELD

The field of the invention relates to a system for generating a human body model. The field of the invention relates more particularly to systems equipped with calculation means enabling a real-time construction of a human body model of an individual to generate an avatar of said individual.

STATE OF THE ART

There are different solutions for generating an avatar in real time that is more or less faithful to an individual's aspects. The expected faithfulness sometimes relates to the individual's posture, kinematics or even emotions.

The most commonly used solution is to represent a skeleton-like body model in order to define points of interest such as joints. These points of interest can be tracked in real time in order to reconstruct a kinematic of a human body according to the rotation coefficients of said points of interest. Patent document WO2019219357, "method and system for animating a 3D avatar" describes a solution of this type.

One drawback of this solution is that the 3D envelope of the individual is not specifically dealt with. While kinematics of the avatar generated can be faithful to the individual's movements or motions, the faithfulness of the 3D representation of the human body model of the individual is not.

Other solutions are concerned with the representation of the face of an individual wearing a virtual reality headset such as the solution described in patent document US2018/096533: "Facial feature views of user viewing into virtual reality Scenes and integration of facial features into virtual reality views into scenes". The aim of this document is to overcome the problem of reconstructing facial features in order to generate an individual's avatar, in particular to reflect his/her emotions. However, the recognition method is based on the identification of points of interest defined by shapes. This identification makes it possible to determine positions of volumes of interest such as the nose. One drawback of this method is that it only allows particular zones such as the nose or the eye contour to be recognized. The method cannot enable an individual's entire human body to be faithfully reconstructed.

Other documents deal with some points of interest forming specific three-dimensional zones. This is the case of patent document U.S. Pat. No. 10,636,193, "Generating graphical representation of a user's face and body using a monitoring system included on a head mounted display". This document describes a solution for automatically detecting zones of interest by an algorithm such as artificial intelligence. Thus, more specific zones of interest of a human body model can be identified such as corners of the lips, the eye contour. These zones of interest are for example mapped in order to be repositioned on a body model derived from a library.

However, a drawback of this method is that the body model remains extracted from a data library. It is possibly customizable, but it does not specifically represent an individual's body model. As a result, the avatar generated borrows some specificities from the individual without however faithfully representing the morphology or surface topology of the individual's body model.

There is a need to define a system and method for generating a human body model in real time that is faithful to an individual to generate a digital avatar.

SUMMARY OF THE INVENTION

According to a first aspect, the invention relates to a method for generating at least one human body model comprising:

Acquiring at least one partial view of at least one individual defining a 3D image from at least one optical device arranged in a position of space;

Generating a human body model by applying a trained neural network to generate a 3D model of said body of the individual from at least one input 3D image, said training of the neural network being performed from a data set comprising a plurality of partial views of the human body, each of the partial views used for training the neural network being generated from a three-dimensional mesh.

One advantage of the invention and in particular of training the neural network by partial views generated directly by three-dimensional meshes is to remove the step aimed at passing through pose or joint coefficients of a parametric model. One interest is to directly generate many three-dimensional meshes from a parametric model to teach neural networks to produce such three-dimensional meshes. Three-dimensional meshes are meshes of a human body generated by the parametric model.

The invention makes it possible to have an algorithm for calculating an end-to-end body model making it possible from a partial 3D image to produce a complete body model directly encoded by a three-dimensional mesh. There is no need to reuse the parametric model with shape or joint coefficients to produce such a mesh.

According to one embodiment, each partial view each represents a three-dimensional surface.

According to one embodiment, the regression model of the neural network is supervised by data describing three-dimensional meshes of partial view of a human body.

According to one embodiment, each of the partial views used for training the neural network is generated from a structured, ordered and connected three-dimensional mesh.

According to one embodiment, a human body parametric model is configured to generate a three-dimensional mesh of a human body, said three-dimensional mesh being used to generate a partial view of a human body in order to train the neural network. This step can be repeated in order to generate a set of training data with different configurations of the human body parametric model.

In other words, each partial view/3D image is used as input data to the neural network whose objective is to learn to regress the underlying three-dimensional mesh.

According to one embodiment, the human body parametric model is parameterizable from shape and joint coefficients defining a given configuration of a human body model.

According to one embodiment, each partial view acquired comprises a 2D image with which is combined digital information for constructing a three-dimensional representation of a surface in space.

According to one embodiment, each partial view defining a 3D image is encoded in the form of a point cloud to define the inputs of the neural network.

According to one embodiment, the inputs of the neural network are defined by input vectors, each input vector comprising the coordinates of a point of the encoded point cloud. According to one example, these coordinates may be accompanied by at least one piece of data encoding a local shape descriptor of the point cloud calculated at said point.

According to one embodiment, the method comprises generating a digital avatar from the body model generated, said generation of the avatar being performed within a digital image defining a virtual context from second data acquired from a data interface, the method comprising displaying the avatar and the virtual context.

According to one embodiment, the method comprises at least twice acquiring at least two partial views of an individual each defining a 3D image from at least two optical devices arranged in two positions of space, each 3D image acquired defining an input of the trained neural network to generate from the 3D input images a 3D model of said individual.

According to one embodiment, the method comprises generating an overall 3D image in real time of each partial view acquired of said individual from said 3D images acquired.

According to one embodiment, the method comprises generating an overall point cloud from a plurality of point clouds generated from each partial view acquired by each optical device (3), said overall point cloud comprising a compilation of points of each point cloud.

According to another aspect, the invention relates to a system for generating a human body model comprising:

an image acquisition system comprising at least one optical device arranged in a position of space, the image acquisition system being configured to acquire at least one partial view of an individual defining a 3D image from said optical device;

calculation means for implementing the method of the invention.

According to one aspect, the invention relates to a method for generating a digital avatar comprising:

Acquiring at least one partial view of an individual defining a 3D image from at least one optical device arranged in a position of space;

Generating a human body model by applying a trained neural network to generate from the 3D input images a 3D model of said body of the individual;

Transmitting first data in real time comprising the body model generated by means of a first communication interface;

Receiving by a second communication interface of a virtual reality headset the first data transmitted from the communication interface, said virtual reality headset comprising a calculator to generate a 3D virtual image in real time comprising a digital avatar generated from the data of the 3D model.

According to another aspect, the invention relates to a system for generating a digital avatar comprising:

an image acquisition system comprising at least one optical device arranged in a position of space, the image acquisition system being configured to acquire at least one partial view of an individual defining a 3D image from said optical device;

calculation means for implementing a trained neural network to generate from at least one 3D input image a 3D model of said individual;

a first communication interface for transmitting first data in real time, comprising at least said 3D model generated, to a second communication interface;

a virtual reality headset comprising the second communication interface to receive the first data transmitted from the communication interface, said virtual reality headset comprising a calculator to generate a 3D virtual image in real time comprising a digital avatar generated from the data (DATA 1) of the 3D model.

One advantage of the invention is to enable a faithful reconstruction of an individual's human body in a virtual environment for real-time applications.

According to one embodiment, the image acquisition system comprises at least two optical devices arranged in at least two distinct positions of space, the image acquisition system being configured to acquire a plurality of partial views of an individual defining 3D images from at least one of the two optical devices, the calculation means being configured to implement a trained neural network to generate from the 3D input images a 3D model of said individual.

According to one of the different aspects of the invention, according to one embodiment, a calculation unit is configured to generate an overall 3D image in real time of each partial view acquired of said individual from said 3D images acquired.

According to one embodiment of the method or system, the neural network is trained from partial views of the human body generated from a human body parametric model.

According to one embodiment of the method or system, the human body parametric model is parameterizable from shape and joint coefficients defining a given configuration of a human body model. According to one embodiment of the method or system, the neural network is configured to calculate by regression a set of shape and joint coefficients, said coefficients defining the input parameters of the parametric model to generate a human body model.

According to one embodiment of the method or system, the calculation means are configured to generate a model of an individual, said model of an individual corresponding to the parametric model parameterized with the parameters derived from the regression of said neural network.

According to one embodiment of the method or system, the neural network is configured to output a three-dimensional mesh of the whole human body model, the system comprising a means for calculating a topological reference of said point cloud.

According to one embodiment of the method or system, the neural network is configured to output a three-dimensional mesh of the whole human body model, said three-dimensional mesh being structured and ordered.

According to one embodiment of the method or system, each partial view acquired by an optical device comprises a 2D image with which is combined digital information for constructing a three-dimensional representation of a surface in space.

According to one embodiment of the method or system, the invention comprises a calculation unit for generating a point cloud in real time of each partial view acquired of said individual from each 3D image acquired.

According to one embodiment, a parametric model is configured to generate a three-dimensional mesh of a human body, said three-dimensional mesh being used to generate a partial view of a human body in order to train the neural network.

According to one embodiment, the method comprises a step of sampling the three-dimensional mesh to generate a point cloud, each point cloud defining a partial view of a human body in order to train the neural network.

According to one embodiment of the method or system, the inputs of the neural network comprise the coordinates of the points of the point cloud.

According to one embodiment of the method or system, the electronic device generates an overall point cloud from a plurality of point clouds generated from each partial view acquired by each optical device, said overall point cloud comprising a compilation of points of each point cloud.

According to one embodiment of the method or system, the calculation unit generates a first mesh of a surface of the individual from the overall point cloud, said first mesh comprising for each point of the overall point cloud an association of said point with a vector comprising a set of shape descriptors.

According to one embodiment of the method or system, the calculator is configured to generate a 3D virtual image comprising said avatar and a virtual context from second data, said second data being received by a communication interface of the virtual reality headset.

According to one embodiment of the method or system, the first data further comprise a piece of movement data of said individual.

According to one embodiment, each optical device comprises:

at least two infrared cameras and/or;

at least one color camera and/or;

at least one pair of color cameras configured to generate 3D images by stereoscopy and/or;

at least three cameras comprising two infrared cameras and one color camera and/or;

at least one infrared projector projecting a pattern and two infrared cameras capturing said pattern projected on the surface of a human body.

at least one light projector projecting patterns of structured light and at least one camera capturing said patterns; and/or a time-of-flight camera and/or;

a laser transceiver device.

According to one embodiment of the system or method, the invention comprises acquiring a plurality of partial views of an individual each defining a 3D image respectively from at least two optical devices arranged in at least two distinct positions of space.

According to one embodiment of the system or method, the invention comprises generating a point cloud in real time respectively of each partial view acquired of said individual from said 3D images acquired, said point cloud defining the inputs of the neural network.

According to one embodiment of the system or method, the partial views acquired are time-stamped.

According to one embodiment of the system or method, the invention comprises a step of merging a 3D image of an individual with the 3D model so as to produce said digital avatar.

According to one embodiment, the virtual reality headset comprises at least one integrated optical device to acquire a 3D image of an individual and/or perform a calibration of the optical system.

According to one embodiment, the system comprises self-calibration of the optical devices of the acquisition system with respect to a benchmark optical device of said acquisition system.

According to one embodiment:

at least one first optical device (3) comprises a first linear arrangement of at least two cameras along a first axis ($A_1$);

at least one second optical device (3) comprises a second linear arrangement of at least two cameras along a second axis ($A_2$).

According to one embodiment, each optical device comprises:

a first set of optical devices comprising a first field of view between 30° and 70° vertically and between 50 and 100° horizontally; and a second set of optical devices comprising a second field of view between 50° and 100° vertically and between 30 and 70° horizontally.

According to one embodiment:

at least two optical devices are distanced in a horizontal plane of a Cartesian coordinate system by a distance comprised within the range [30 cm and 500 cm];

at least two optical devices are distanced along a vertical axis of a Cartesian coordinate system by a distance comprised within the range [30 cm and 500 cm].

BRIEF DESCRIPTION OF THE FIGURES

Further characteristics and advantages of the invention will be become clearer upon reading the following detailed description, with reference to the appended figures, that illustrate.

A first aspect and a second aspect of the invention relate to a system and a method for constructing a 3D model of a human body. The invention is described with regard to an application case that of generating an avatar in a virtual image, for example displayed in a virtual reality headset.

However, the invention finds other modes of use such as generating a human body model to control the motions of a medical robot arm or a drone around a patient or to perform real-time monitoring of an athlete's motions during a sports competition in order to generate performance indicators. The invention finds many applications of human-machine interaction.

The system of the invention comprises an optical acquisition system comprising at least one optical device 3. According to one example, the system may comprise a virtual reality headset 6. According to different implementations, the calculation means for generating the human body model MOD_S in real time can be integrated into the optical device 3, in an outer housing such as a games console or directly in an electronics of the virtual reality headset 6. The system 1 of the invention may therefore comprise an outer housing collecting the data acquired by the optics in order to combine them before transmitting new data to the virtual reality headset 6 or to any other equipment utilizing the body model produced.

The associated method of the invention makes it possible to implement these steps of generating a human body model or exchanging data between the different elements of the system of the invention.

Optical Device

Figure 1:
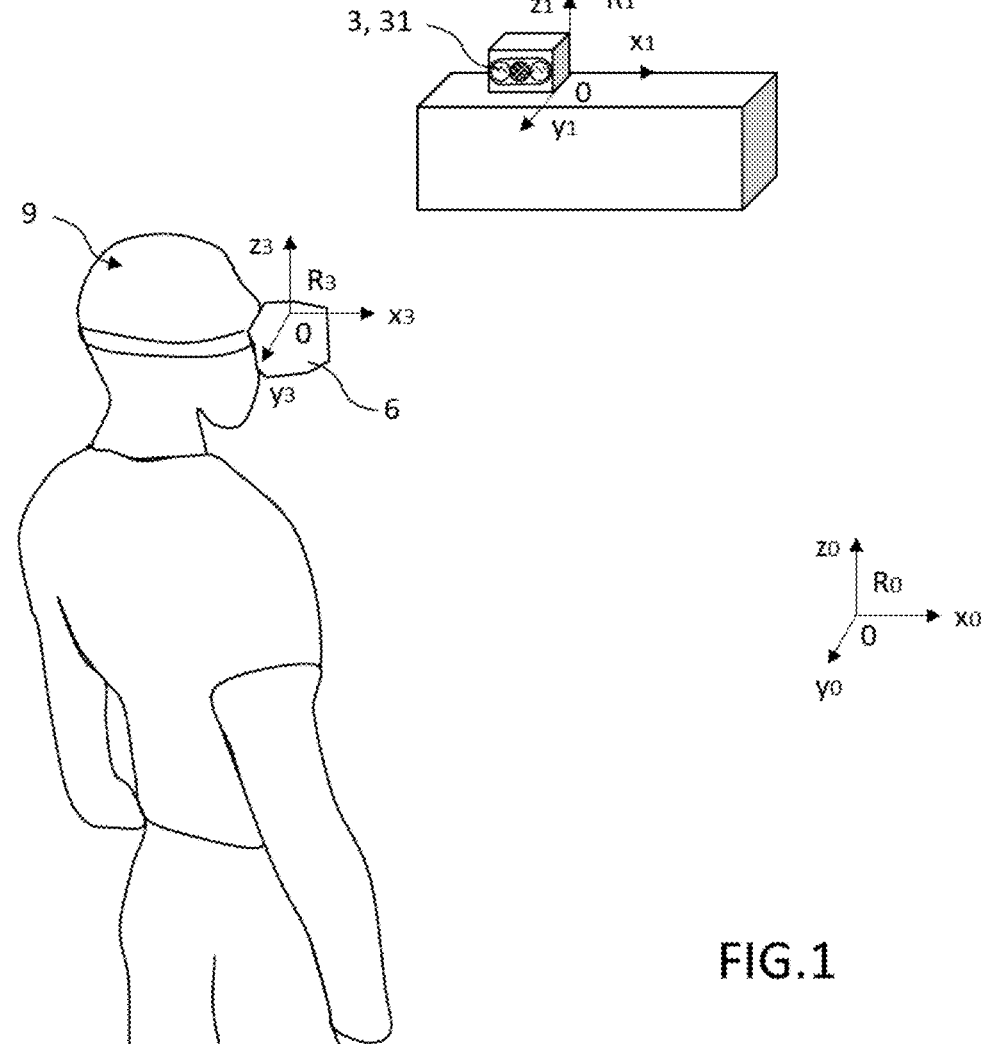
FIG. 1: an embodiment of the system of the invention in which an optical device is implemented.

FIG. 1 represents an example embodiment of the invention in which an optical device 3 is disposed, also denoted as 31, and also referred to more generally as the "acquisition device".

Figure 2:
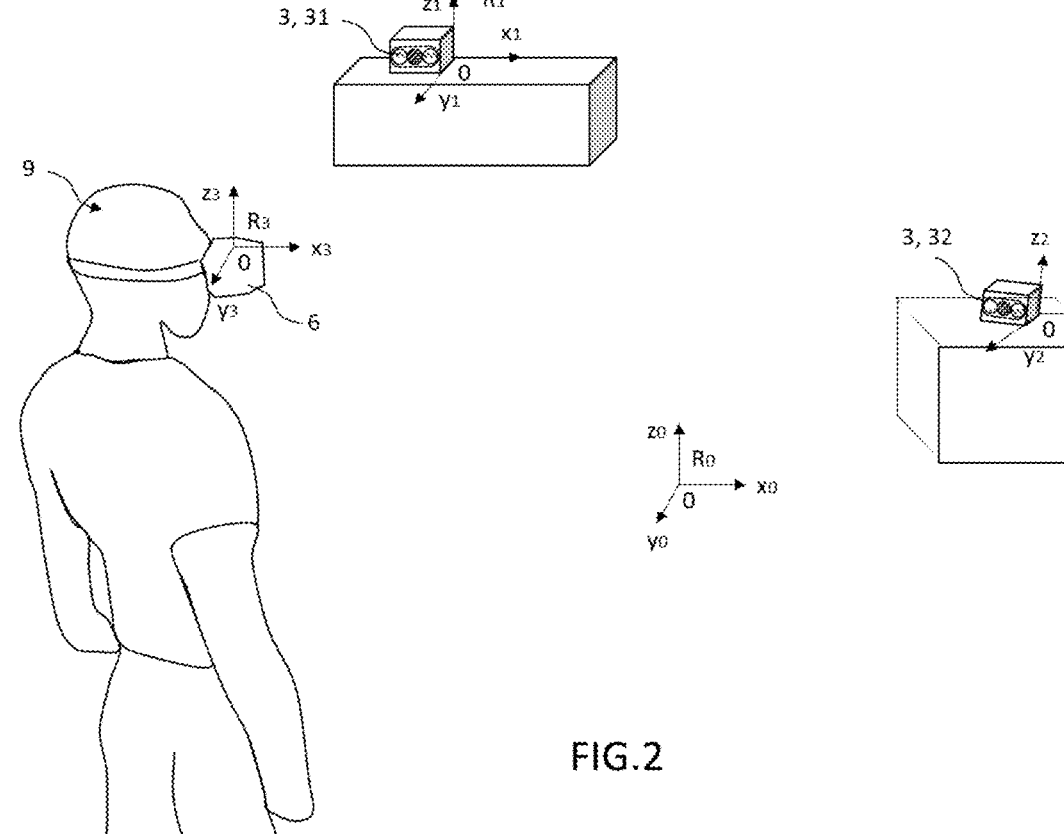
FIG. 2: an embodiment of the system of the invention in which two optical devices are implemented.

FIG. 2 represents an example embodiment of the invention in which two optical devices 3 denoted as 31 and 32 respectively are disposed.

Notation 3 is used when describing an optical device in general. The system 1 of the invention may comprise a plurality of optical devices 3, in particular more than two optical devices 3 in order to increase the resolution of the 3D image, the processing speed or even provide a better field of view. However, the invention can be implemented with a single optical device 31.

In the case where several optical devices 3 are used, preferably they are disposed at distance from each other. They can either be made integral with each other, for example, by a holding rod or by a positioning rack, or be unconstrained from each other in order to allow free arrangement of each optical device 31, 32 in space.

The two optical devices 3 are preferably arranged within a room on furniture so as to orient their optics towards a free space of said room in which one or more individuals 9 will move.

The invention can be implemented according to different arrangement configurations of the optical device(s) 3. According to one embodiment, the optical device 31 may be arranged in space or alternatively attached to the virtual reality headset 6 so as to acquire the image of another user. In this case, this optical device 31 may also be used in combination with another optical device 32 arranged in such a space or even it may also be attached to the helmet 6 and oriented so as to acquire images of the arms or more generally parts of the body of the individual 9 wearing the helmet 6.

Each optical device 3 is configured to generate a 3D image of a human body of an individual 9. This 3D image is also referred to in the description below as the partial view. It is understood that each optical device 3 can acquire only a part of the human body of an individual 9 at a given time. Thus, when several optical devices 3 are used, the use of data from different partial views VP$_1$, VP$_2$ makes it possible to increase the modelable body surface of one or more individuals 9.

Figure 3:
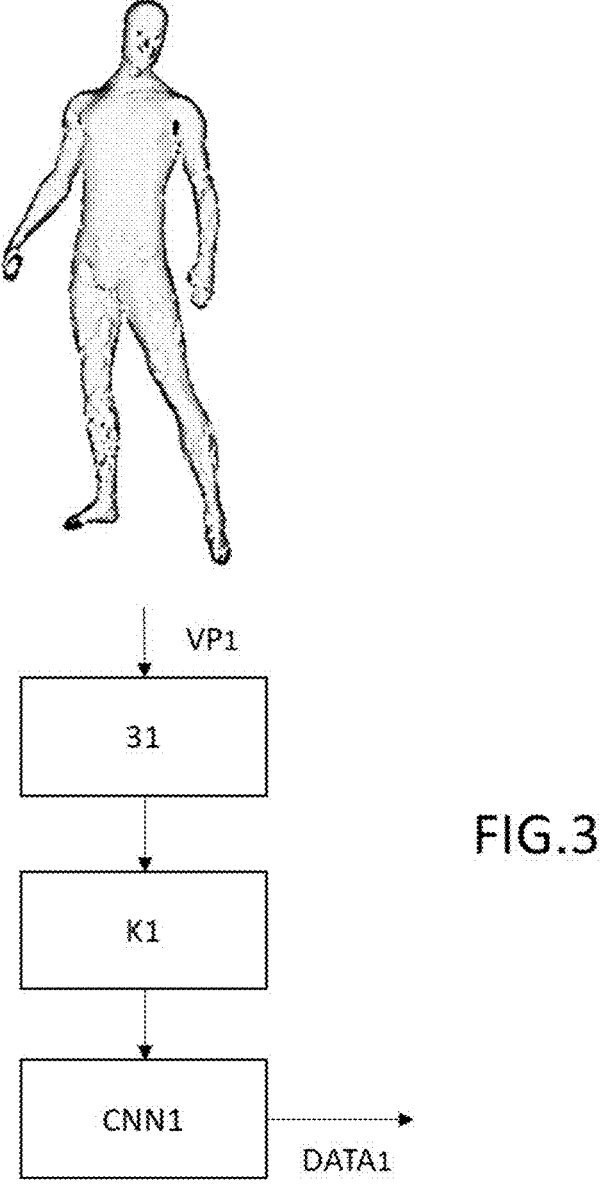
FIG. 3: an embodiment of the method of the invention in which the processing of partial views acquired in real time by an optical device in order to generate a digital avatar from the reconstitution of a human body model, is represented.

FIG. 3 describes an example method in which a partial view VP$_1$ acquired by an optical device 31 of the invention.

Figure 4:
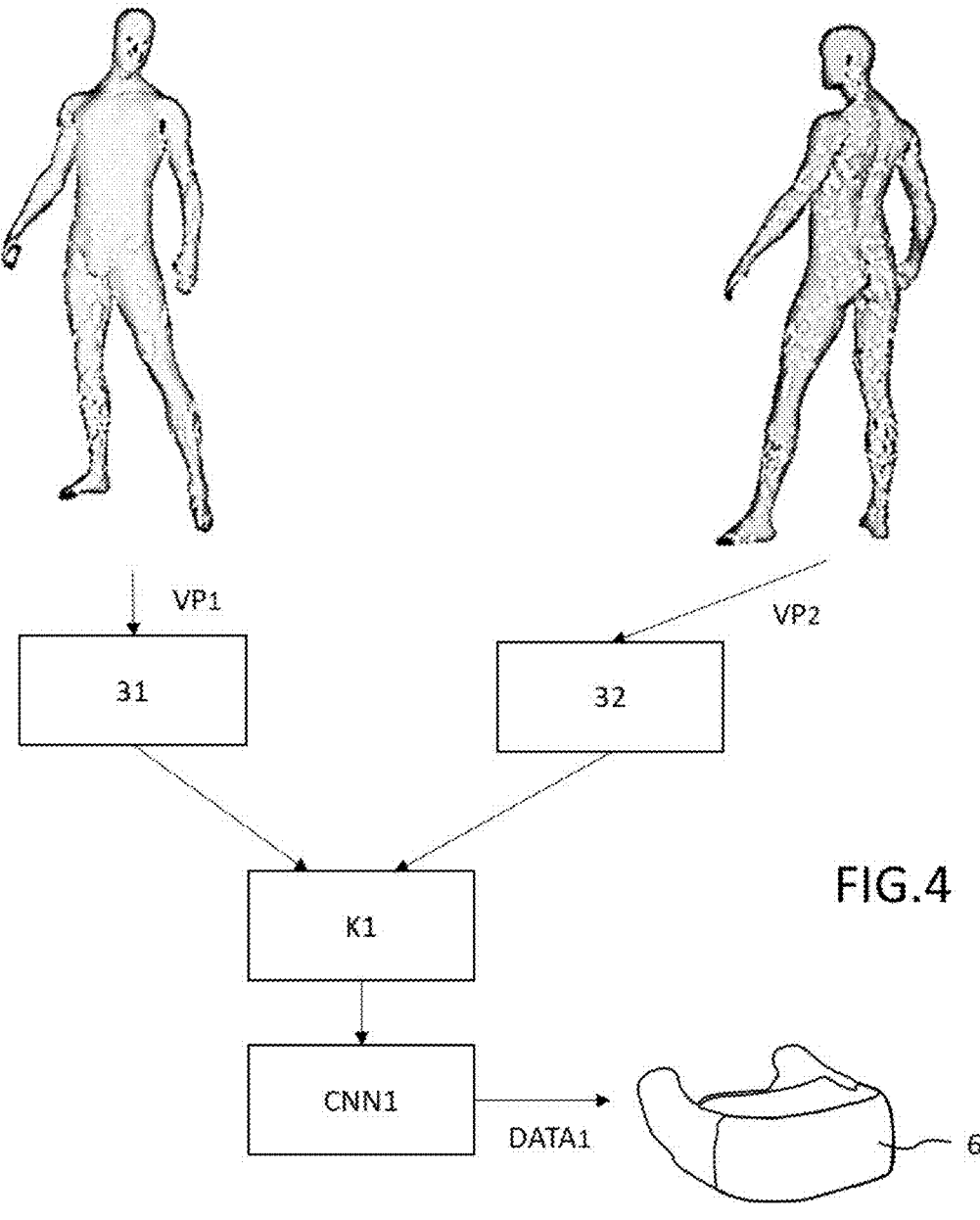
FIG. 4: an embodiment of the method of the invention in which the processing of the partial views acquired in real time by two optical devices in order to generate a digital avatar from the reconstitution of a human body model, is represented.

FIG. 4 shows the case where at least two optical devices are arranged to acquire different partial views in real time. VP$_1$ are the partial views acquired in real time by the optical device 31 and VP$_2$ are the partial views acquired in real time by the optical device 32.

The aim of the invention is to reconstruct the entire body of an individual from at least one partial view VP$_1$. These partial views are preferably acquired simultaneously and continuously in order to produce a body model in real time. One advantage of the invention is to take advantage of a trained neural network so that reconstruction of a complete human body model is generated from a minimum of one partial view. Other embodiments in which 3, 4, 5 or 6 partial views acquired simultaneously make it possible to reconstruct a body model of an individual 9.

According to one example embodiment, the optical devices are synchronized with each other by means of a clock and a signal previously transmitted from one to the other. In particular, this synchronization allows coordinate acquisitions of partial views of an individual 9 to be triggered. Other means of synchronization can be implemented, for example, by means of an outer housing that sends a sync signal to each optical device. The signal sent can be sent when the method is initialized or can be transmitted regularly.

According to one embodiment, the acquisitions are time-stamped in order to associate a date with a partial view. This association makes it possible, in particular, to coordinate the combination of the point clouds constructed from the images of each optic or to provide corrective factors if the dates are slightly offset.

Acquiring a Partial View

Within the scope of the present invention, a 3D image or a partial view can be defined by a set of images of a same subject, at least two images, for generating depth information of said subject. According to one example, the 3D image can be a stereoscopic image, that is, a pair of images, such as two so-called left and right views, taken by two optical sensors taking a same scene from two slightly distant points of view. The spectrum of such an image may be in the visible or the infrared. In this case, a 3D image may be a pair of color or infrared images. According to another example, a 3D image can also be understood as an image that is directly associated with a depth map, according to another example, a 3D image can be understood as a point cloud representing a sampling of a three-dimensional surface obtained from images acquired of a subject. The 3D image may also comprise other information, in addition to points, such as color information. According to one embodiment, the 3D image comprises a 2D image and depth information estimated by a depth estimation algorithm. According to one embodiment, the 3D image comprises a 2D image and a three-dimensional mesh calculated according to the method of the invention.

More generally, a 3D image or a partial view designates: a 2D image with which is combined digital information for constructing a three-dimensional representation of a surface in space. This digital information may be a second image, a depth map, or any other data calculated for constructing a point cloud in space from a 2D image.

According to one embodiment, each optical device 3 comprises a pair of cameras for generating a depth map of the image acquired. When an optical device comprises at least two sensors, this is sufficient for the method according to the invention to generate a three-dimensional mesh from a single optical device 3. According to one example, the cameras are infrared cameras. Infrared cameras provide resolutions that enable a depth map to be drawn, the accuracy of which makes it possible to reproduce differences in reliefs on the surface of an individual's body located at a distance between a few centimeters and 3 m, or even 4 m, from the optical devices 31, 32.

In the case where the optical device 3 is mounted to the virtual helmet 6 to acquire images of the own body of the individual 9 wearing said helmet, for example his/her arms or hands, the distance may be a few centimeters.

According to one method, 2D images acquired from a same object from two points of view of a same optical device 3 the arrangement of which is known may be combined using known techniques to obtain a so-called "depth" or "distance" map.

According to one embodiment, each optical device 3 comprises 3 cameras, among which a pair of infrared cameras and a color camera.

According to one example, the acquisition devices 3 may comprise a pair of 3D color infrared cameras and at least one infrared projector. According to one embodiment, the optical device 3 comprises a laser infrared projector for projecting an image comprising patterns, in particular on the surface of a human body. The pattern projected is then acquired by the pair of infrared cameras in order to reconstruct a depth map in real time by stereoscopy.

According to another example, the acquisition devices 3 may comprise a pair of color cameras configured to perform passive stereo in order to generate the 3D images.

According to another example, the acquisition devices 3 may comprise a color camera and a light projector projecting patterns of structured light.

The images acquired can then be processed to analyze the deformation of the projected pattern. This technique makes it possible to obtain an additional piece of data and makes it possible to improve the 3D reconstruction. In particular, detecting a deformation of a projected pattern makes it possible to improve the accuracy of the disparity map between two images used to generate the depth map. Furthermore, the projector makes it possible to reduce noise when constructing the point cloud to generate the first graph $G_1$.

According to one embodiment, the patterns of the image are regular patterns for example representing a regular shape. According to another embodiment, the patterns are generated randomly.

According to alternative embodiments, other technologies may be implemented in the invention to reconstruct a depth map for example from time-of-flight camera. In the latter case, the 3D camera can, for example, be replaced by a time-of-flight ToF camera. In this case, it is a visible or infrared light or laser beam coupled with a camera or photosensitive receiver for measuring the time-of-flight of different beams fired in the space and hence to reconstruct a 3D mapping thereof.

Other techniques for constructing a depth map may be used, such as a laser transceiver device. The reflection of the laser beam is used to generate a piece of data relating to the geometry of the reflection surface. Another technique may be based on an ultrasonic transceiver. An example system that could be implemented is the LIDAR type system.

Calibration

According to one embodiment, the invention and more particularly the method of the invention comprises a step of calibrating each optical device and/or cameras of each optical device 3

The following coordinate systems are defined and illustrated in FIG. 1 and/or FIG. 2:

$R_0$: world frame of reference in which the individual 9 wearing the virtual reality headset 6 moves, $R_0$ could also be a coordinate system associated with a mobile robot arm or any equipment in which motions may influence the representation of the body model;

$R_1$: frame of reference related to a first optical device 31, $R_2$: frame of reference related to a possible second optical device 32.

$R_3$: frame of reference related to the virtual reality headset 6.

A first inter-camera calibration, called "stereoscopic calibration", can be performed, for example, between the two cameras of a same optical device 3 to perform a 3D reconstruction of a subject. The aim of the first calibration is to calculate a transformation between two images acquired by each of the cameras of a same optical device 3 within the coordinate system $R_1$ or $R_2$. This calibration makes it possible to ensure the transformations between the coordinate systems of the different cameras of a same optical device 3.

A second calibration makes it possible to ensure the transformations between one optical device 31 and another optical device 32.

The second calibration may comprise the definition of a reference camera of an optical device 31 or 32 so that the transformations are made with respect to the benchmark coordinate system. The benchmark coordinate system may also be chosen on an outer housing collecting the data of each optical device 31, 32 or on the virtual reality headset 6 or any other equipment whose motions influence the representation of the body model MOD_S.

The second calibration can be performed in different ways that can be combined or not. The aim of the second calibration is to calculate transformations from $R_1$ to $R_2$ or from $R_2$ to $R_1$ or from $R_1$ and $R_2$ to $R_0$ for example.

A first method consists in establishing a communication between the two optical devices 3 in order to exchange coordinates from a first device 31 to a second device 32 by means of a wireless link. In this method, each optical device 3 comprises means for calculating its position and orientation, for example, from an inertial unit.

A second method can be performed by projecting a pattern of a first optical device 31 that is acquired by the second optical device 32 in order to calculate the deformation of the pattern projected. An example embodiment comprises projecting a checkerboard whose deformations acquired by each camera allow a corrective factor to be generated to calculate the transformation of a frame of reference with respect to another frame of reference. The corrective factor may take account of the position or orientation of said camera with respect to another camera, or respectively an optical device 3 with respect to another optical device 3. The pattern can be transmitted in the infrared range or in the visible range. Deformation of the pattern allows a transformation from one frame of reference to another to be calculated. According to this method, each optical device 3 can project a pattern for the other optical devices 3 to calculate the deformation of the pattern in order to determine the transformation from one frame of reference to another.

A third method may be implemented from an outer housing dissociated from the optical device(s) 3. The housing is positioned so as to acquire an image of each optical device 3 and possibly a pattern positioned on each optical device 3. This solution makes it possible to calculate the positioning and arrangement of each optical device 31, 32 in space in order to transform the images acquired by each optical device 31, 32 in a single frame of reference.

A fourth method comprises a process of iteratively aligning the different point clouds generated by the different optical devices 31, 32. This embodiment is used when at least two optical devices are implemented. Such an algorithm is called "iterative closest points". This calibration ensures that a point cloud calculated by an optical device 31 corroborates with another point cloud calculated by another optical device 32. This is the identification of the common points of the point clouds that allows a subsequent calculation of a transformation factor from one frame of reference to another.

According to a fifth method, calibration may also be performed by studying the transformation there is between a color image pair.

Other methods for calibrating the frames of reference of optical devices may be used within the scope of the invention.

Electronic Device

According to one embodiment, the system 1 of the invention comprises an electronic device (not represented) comprising a calculation entity which comprises a minimum of one calculator which may be an electronic component provided with a processor. The electronic device further comprises a memory for storing configuration parameters of the system 1, the calibration parameters of each optical device 3, the instructions necessary to run the software operating to generate an avatar in real time, the models of the human body of an individual 9, the configuration and parameterization data of the sensors, transmitters or any other equipment driven by the system 1, data such as those making it possible to run the neural network used to reconstruct the surface of the body of the individual 9 from optical data such as an image, a depth map or a point cloud. The latter data of the neural network may comprise coefficients of the network, data of a classifier, data of a regression function.

The electronic device may be a single component or in a second embodiment, it may comprise different components that are associated with different elements of the system 1, such as the virtual reality headset, an outer housing or at least one optical device 3.

A first objective of the electronic device is to generate a surface of a human body MOD_S of the individual 9 in real time from at least one partial view acquired by at least one optical device 3.

According to different embodiments, the method of the invention comprises steps of recording configurations, extracting recorded data, storing point clouds or the body model generated.

Point Cloud

From the depth map and more generally from each partial view $VP_i$ acquired, the invention makes it possible to generate a 3D image such as a point cloud $NP_i$. Each 3D image or more specifically each point cloud NPi associated with each partial view $VP_i$ in space is likely to represent a partial mesh of the surface of the body of a human, such as the individual 9. Mesh is here understood as a set of points defining the boundaries of a three-dimensional surface. Each point in the point cloud $NP_i$ can be associated with a three-dimensional spatial coordinate of a frame of reference $R_1$ or $R_2$. Coordinates can be transposed into any other coordinate system such as $R_0$ or $R_3$ from a transformation function from one frame of reference to another. The points of the point cloud then constitute a first graph $G_1$. According to one example, the points of the first graph $G_1$ obtained are non-oriented and non-connected. In its simplest form, the graph $G_1$ is a non-ordered list of points whose coordinates are referenced in space, for example in a frame of reference $R_0$ of the space in which the individual 9 moves or a frame of reference associated with the virtual reality headset 6. The points are then defined independently of each other. In its simplest form, the graph $G_1$ is therefore a point cloud. FIG.

6 represents an example of the point cloud $NP_1$ representing the anterior face of a human body from which a 3D image is acquired.

When a depth map is established, the latter makes it possible to generate a grid of points/pixels whose intensity corresponds to the relative distance from the camera. According to another example, the distances between points are generated independently from a shape recognition such as an envelope of a body.

According to one embodiment, the method of the invention makes it possible to retrieve a point cloud derived from the images acquired and to transfer it for example to a graphic processor such as a GPU, GPU meaning "Graphic Processing Unit".

The images can be processed so as to extract an acquisition perimeter limiting the zone to be processed. For this, a template or segmentation mask, optionally obtained using a neural network, can be used to avoid considering points outside a zone of interest defined by the surface of the body.

The acquisition of images by all the optical devices 3 makes it possible to increase the coverage of the surface to be processed, making it possible to generate a depth map of a large part of the body of an individual 9. FIG. 4 represents the anterior face and posterior face of the body of an individual 9. These images can be obtained, for example, by disposing the optical devices substantially facing each other.

According to one example, the number of points generated per surface unit is configurable according to a desired resolution of the point cloud. The acquisition can be configured to increase the spatial resolution of each point cloud $NP_1$, generated by increasing the resolution of the images. It can also be configured to increase the temporal resolution by increasing the number of images collected per time unit. The resolution can also be increased by increasing the number of optical devices 3.

According to one embodiment, each optical device 3 calculates a point cloud, such as the point cloud $NP_1$, from the images acquired. Thus, according to the example of FIG. 3, at each acquisition, the optical system 1 activates the optical device 3 so that:

the optical device 31 generates a set $ENS_1$ of points of the point cloud $NP_1$;

According to the example of FIG. 4, at each acquisition, the optical system 1 activates all the optical devices 3 so that:

the optical device 31 generates a set $ENS_1$ of points of the point cloud $NP_1$;

the optical device 32 generates a set $ENS_2$ of points of the point cloud $NP_2$.

The electronic device comprises calculation means to generate an overall point cloud $NP_G$ comprising all the points of the different sets generated for example in the case of the use of two optical devices $ENS_{31}$, $ENS_{32}$. One interest is to obtain as complete a point cloud as possible representative of the body of the individual 9. In particular, the overall point cloud $NP_G$ is established after a calibration of the optical devices is performed and at least one transformation of each point cloud $NP_1$, $NP_2$ acquired is performed to operate the point clouds in a same frame of reference.

According to one embodiment of the method according to the invention, the electronic device is configured to perform different operations as follows:

application of a transfer function based on a calibration configuration of the different optical devices 3 with respect to a benchmark frame of reference of the system 1;

correlation between the different sets of points in order to determine a common subset of points and a subset of points not shared by the different point clouds;

optionally, check for calibration errors of an optical device 3;

determination of an overall point cloud $NP_G$ comprising all the points of the different sets of points $ENS_1$, $ENS_2$ generated by each optical device 3.

Processing the Point Cloud and Calculating the Shape Descriptor

According to a first embodiment, the 3D image, or more specifically the point cloud, generated from a partial view acquired of an optical device is directly used as an input in the neural network.

According to another embodiment when different optical devices 3 are used jointly, the 3D image obtained by combining a plurality of partial views, such as the overall point cloud $NP_G$ obtained, is directly used as an input of a neural network called $CNN_1$. In this embodiment, the point cloud can be summarized as all the points, each point being characterized by its coordinates in the 3D space in a benchmark frame of reference. This benchmark frame of reference can be one of the 4 defined frames of reference, namely $R_0$, $R_1$, $R_2$ or $R_3$.

According to an alternative when different optical devices 3 are used, the two point clouds $NP_1$ and $NP_2$ are directly used as an input of the neural network $CNN_1$ without necessarily calculating an overall point cloud $NP_G$. More generally, when a plurality of point clouds is calculated simultaneously by a plurality of optical devices 3, in this example, they can define distinct inputs of the neural network $CNN_1$.

According to a second embodiment, a calculator is configured to perform an operation aiming at calculating local topological information of each point of a cloud $NP_1$ or the overall point cloud $NP_G$. One interest is to construct input vectors of the neural network comprising additional geometric data. This embodiment makes it possible to calculate local shape descriptors at each point of the point cloud $NP_1$, $NP_2$ or $NP_G$. According to one embodiment, a connected graph is obtained from the point mesh. The method consists in associating with each point of the connected graph attributes derived from calculations made on the adjacency matrix of the connected graph. This corresponds to the calculation of functions applied to each point, among which its coordinates, and their neighborhood so as to generate shape descriptors, or shape coefficients.

One advantage of shape descriptors is to characterize a local topology of the surface at a point of the first graph $G_1$. When the body of an individual 9 moves or changes over time, the body surface is considered as a deformable object whose transformations are non-isometric. The shape descriptors make it possible to generate at each point specific characteristics that it is possible to recover by the method of the invention after a deformation.

According to a first embodiment, the shape descriptors can be calculated from functions applied locally to the point under consideration. According to one embodiment, at least one local shape descriptor and/or one overall shape descriptor are defined. The descriptors can be of the type: "Wave Kernel Signature" or "Heat Kernel Signature" or "Gaussian Curvature". One advantage is to define shape descriptors from a spectral analysis of the region in the neighborhood of a point of the point cloud or the graph derived from the point cloud. One advantage is the simplified use of standardized equations or operators whose digital processing can be optimized.

According to a second embodiment, the shape descriptors are automatically calculated at each point of the point cloud $NP_1$, $NP_2$ or $NP_G$ by a neural network configured to calculate them automatically. This output of a first neural network makes it possible to define an input of a second neural network $CNN_1$. Thus, the first neural network would be configured to calculate shape descriptors at each point of the point cloud acquired to enrich the inputs of the second neural network $CNN_1$, said second neural network $CNN_1$ being configured to calculate a human body model MOD_S according to one of the methods described below.

Using a Trained Neural Network

The electronic device of the invention comprises at least one memory and a calculator for calculating a human body model MOD_S from a trained neural network. The implementation of the trained neural network may be performed so that it processes, as an input, vectors comprising the coordinates of each point of the point cloud and possibly attributes describing shape descriptors previously calculated associated with said points when the second embodiment is implemented.

Other implementations of the neural network may be performed within the scope of the invention so that it more generally processes, as an input, data describing a 3D image. These can be, for example, data characterizing the depth map. Thus, the example of data describing a point cloud is an embodiment of the invention.

The neural network can be trained in different ways so that it outputs either a new point cloud directly or a graph insofar as the points are linked together, or coefficients for configuring a parametric model MOD_P of a body. Thus, the coefficients output define an input configuration or parameterization of a parametric model MOD_P of a body. It is therefore possible to train and therefore configure the neural network so as to adapt its output at the end of the regression operation.

One advantage of training the neural network to output a three-dimensional mesh and not coefficients is that the output of the network can be directly utilized to produce a body model without having to generate a model from the coefficients output from the network.

Figure 7:
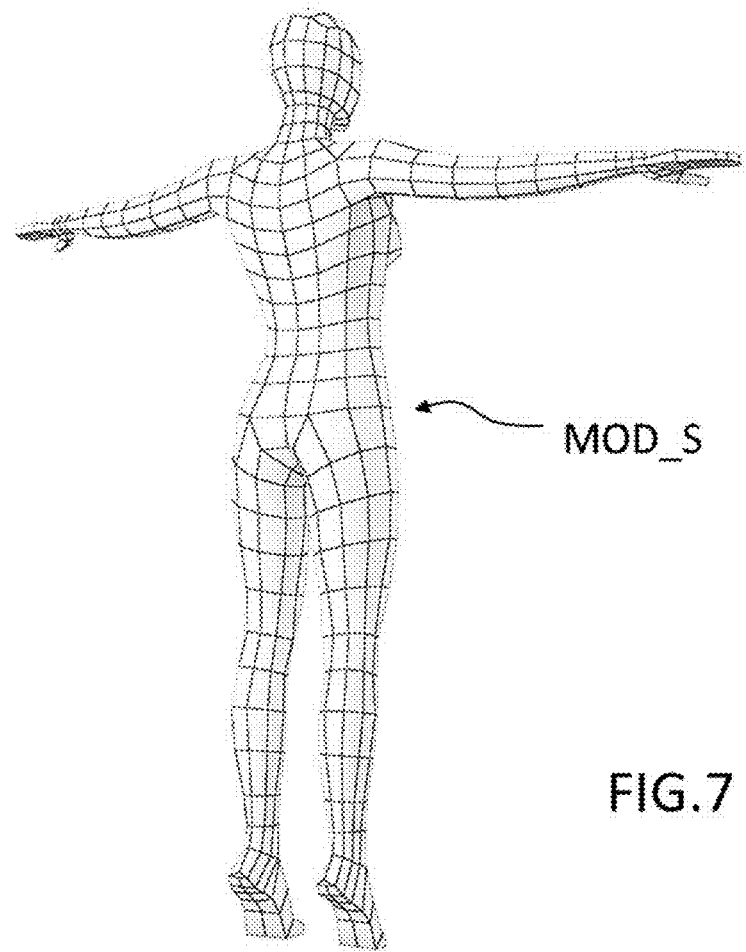
FIG. 7: an embodiment of a human body model generated from acquisitions of each optical device of the invention.

An example of a body model MOD_S is represented in FIG. 7 of a body of an individual.

In both example cases, according to one embodiment, the neural network $CNN_1$ is trained from a set of partial views $\{VPA_i\}_{i \in [1:N]}$ defining different views of different human bodies of individuals.

According to a first example, each of these partial views can be defined by a 3D image, such as a point cloud comprising a plurality of points, the 3D image being defined for example by a set of points having coordinates and possibly data relating to their neighborhood such as links, references, scheduling, etc. When the neural network $CNN_1$ is trained to reconstruct a three-dimensional mesh of points as an output, the regression model is supervised by data describing three-dimensional meshes. In this case, the parametric model is used to produce many three-dimensional meshes without using its coefficients in the training. According to one example, each three-dimensional mesh comprises between 1000 and 100,000 vertices. This mesh is sampled to generate a 3D image.

According to a second example, each of these partial views can be defined by a set of so-called shape coefficients and joint coefficients. When the neural network $CNN_1$ is trained to generate and predict coefficients as an output defining input parameters of a parametric model, the regression model is supervised by a type of data describing in this case coefficients for generating a body model. The construction of the body model can then be performed from a body parametric model in which the coefficients obtained at the end of the regression can be used.

The partial views used for learning the neural network are denoted as VPA. To this end, a human body parametric model MOD_P can be used to produce many partial views $\{VPA_i\}_{i\in[1:N]}$ of human bodies with different parameterizations. One advantage of this solution is to have a very large number of partial views VPAi of different human bodies in order to train the neural network $CNN_1$. A human body model in a given posture allows different partial views VPA of the body in this posture to be generated. Thus, by changing the postures of a same body and also changing the body models by means of the parametric model MOD_P, it is possible to produce a very large number of partial views VPAi of the human body. Such a possibility provides a great capacity to reduce response times and increase the quality of the models produced to generate human body models MOD_S of an individual 9 in real time.

Such a training method also makes it possible to supervise the training of the neural network $CNN_1$ since the parametric model MOD_P makes it possible to generate the complete body model of the configuration chosen, hence the expected output of the network can be known and hence supervised. The neural network $CNN_1$ can thus be trained with a very high correction capacity propagated in the regression performed. Thus trained, the neural network $CNN_1$ having at least one partial view $VP_1$ as an input can be implemented to generate a body model MOD_S. The body model MOD_S can take the form of a mesh of points defining a graph or at least a point cloud. Other training solutions can be implemented from a human body library. One major advantage of this implementation is to have directly as an output of the neural network a point cloud or a graph representing the mesh of a three-dimensional surface. When the optical device(s) continuously acquire 3D images forming partial views VP1 and/or VP2, the neural network $CNN_1$ is configured to output a body model MOD_S in real time.

In order to obtain a scheduling of the vertices of the mesh produced by the neural network $CNN_1$, the method according to the invention may comprise a step implemented to calculate topological references in order to coordinate the production of a human body model MOD_S in real time in order to make it change in a frame of reference. This solution also makes it possible to perform time monitoring of any point on the surface of the body model MOD_S at points of interest, in particular for "tracking" applications. For example, when the digital avatar generated follows the motions of an individual wearing a virtual reality headset, for example by avoiding an obstacle or throwing a virtual object, monitoring some zones of interest of the body model MOD_S can be interesting to create interactivity with a virtual context into which the digital avatar is integrated.

According to this first example case, in order to generate a human body model MOD_S of the individual 9, a step of calculating a topological reference of the human body model MOD_S is performed. The aim of the calculation of a topological reference of the body model is to identify an identifiable topological pattern between two successive generations of body models MOD_S. This topological reference can be used for real-time monitoring applications, in other words "tracking" applications. In addition, it improves real-time monitoring of changes and motions of all or part of the body model MOD_S in space. It is then possible to multiply the applications improving the synergy between the motions of an avatar generated and the interactive elements of a virtual context interacting with said avatar in the same image generated in the virtual reality headset 6.

According to one embodiment, a plurality of topological references is calculated. This can be, for example, a set of points on the nose, extremities, joints, etc. of the body model.

This operation can be performed by applying an algorithm aiming at correlating two body models successively calculated to identify common patterns in order to define common topological references.

The body model can therefore take the form of a three-dimensional mesh of structured, ordered and connected points. A structured mesh implies that each point in the mesh retains the same references of neighboring points in its neighborhood. An ordered mesh implies that each point is referenced and can be designated among all points in the mesh. Finally, a connected mesh implies that each point comprises in its definition the data characterizing the links with its neighboring points.

Such a three-dimensional mesh has an advantage to facilitate the real-time monitoring operations of a point, for example when it is associated with another point of a digital context of the virtual image.

In the first example, the electronic device is then able to generate a body model MOD_S from a 3D image, such as a point cloud, said body model MOD_S being directly derived from the regression of the neural network. The body model MOD_S can be oriented and referenced in space from characteristic points of a three-dimensional mesh defining the body model MOD_S.

One advantage of using a trained neural network $CNN_1$ for directly generating a connected graph G, also called a three-dimensional connected mesh, is to implement an end-to-end algorithm. This solution allows not to use as an output a human body parametric model MOD_P which has to be configured from coefficients calculated by a trained neural network $CNN_1$. The latter method is detailed below and is a second example case.

In an example case, the neural network $CNN_1$ is configured to output coefficients from the inputs defined by the 3D images acquired. These 3D images acquired make it possible to obtain the points of the point clouds of each 3D image. The output data of the neural network $CNN_1$ are obtained by a regression of the network $CNN_1$. These coefficients can be shape or joint coefficients such as rotations. The neural network can be configured to output coefficients that can be directly used within a parametric model MOD_P.

In this example case, the coefficients obtained by regression are applied to a predetermined parametric model MOD_P in order to generate a parameterized body model MOD_S defining a three-dimensional surface of the individual 9. This body model MOD_S generated can then be used to generate a digital avatar. In the example case of a utilization of this body model for a representation within a virtual reality, the image of the body model can be generated in a virtual environment while taking account of the position and orientation of the virtual reality headset 6. The orientation and position of the virtual reality headset 6 are obtained by transforming $R_3$ into $R_0$ or vice versa.

In this second example case, training of the neural network $CNN_1$ can also be performed from a human body parametric model MOD_P defined by parameters such as shape and rotation parameters of joints, previously defined by coefficients.

Thus, in the two example cases provided, whether three-dimensional mesh or output coefficients, the neural network can be trained from partial views generated by a parametric model MOD_P parameterized with configurations making it possible to create a plurality of partial views $VPA_i$ of different body models in different positions.

In the example case of a regression generating coefficients, the electronic device is then able to calculate the three-dimensional mesh corresponding to the parametric model MOD_P parameterized with parameters defined by the coefficients produced by the regression of the neural network.

Thus, the surface area of a human body MOD_S can be calculated in real time from an acquisition of one or more partial views $VP_1$, $VP_2$ of an individual 9 and a trained neural network.

One advantage of a real-time calculation of the modeled surface area MOD_S of the body of an individual 9 is to restore a fluidity of the motions of the avatar in a virtual environment consistent with the motions or movements of the individual 9.

The advantage of the method of the invention is to be able to generate a new modeled surface area MOD_S in less than 15 ms. These response times allow, in particular, response periods to be obtained for interactive video game applications. The configuration of an acquisition by a camera may be for example from 10 to 90 fps.

Configuration of the Neural Network

According to one embodiment, a first three-dimensional image may be generated by the electronic device from all the partial views $VP_1$ acquired by each optical system 3 so as to obtain an overall view of the body MOD_S of the individual. In the case of the implementation of a single optical device 3, the partial views $VP_1$ acquired in real time by said optical device 3 define data to be processed to define the inputs of the neural network. In the case of an implementation of a plurality of optical devices 3, the partial views $VP_1$, $VP_2$, etc. acquired in real time by said optical devices 3 define data to be processed to define the inputs of the neural network. These data are then preferably time-stamped so as to coordinate the reconstruction of different partial views at given time instants.

According to one embodiment, the configuration of the neural network $CNN_1$ may comprise:

Convolutions or neural network layers comprising a plurality of multiplications of matrices comprising weighting coefficients obtained from a learning method;

non-linear operations.

According to one embodiment, the configuration of the neural network $CN_1$ comprises as inputs:

the points of the point cloud and the value of their attributes and/or;

the adjacency matrix of the graph corresponding to a point cloud.

The neural network $CNN_1$ may comprise convolutions in its first layers, then fully connected layers of neurons at the end of the model. In the latter case, they are neurons connected to all neurons in the previous layer and connected to all neurons in the next layer.

The convolution layers may comprise a scan of an input matrix producing a series of matrix calculations. The other layers of the neural network typically comprise matrix calculations on the size of the input matrix.

According to one example, each convolution comprises a matrix product between an input matrix and a weight matrix and the consideration of an additional bias.

The application of successive layer processing within the neural network $CNN_1$ comprises the application of a series of matrix multiplications which are followed by a non-linear function to produce an output of said layer. The succession of these operations defines the depth of the neural network.

According to one example embodiment, the neural network is a multilayer perceptron, known as MLP. According to one example, the neural network may be a network equivalent to MLP.

According to one example, the neural network is configured so that the result is invariant by permutation of the points in the input list. This configuration is made possible by the use of aggregation functions such as the function known as "MAX POOLING" or "AVG POOLING".

According to one embodiment, the structure of the neural network makes it possible to extract attributes from the input at different scale. The neighborhood of each point in the point cloud at different scales is successively considered to extract an encoding in a reduced dimension space of the input. This encoding is then passed through a series of fully connected layers to perform a regression either on all parameters of the human body parametric model MOD_P, or directly on the points of the point cloud(s).

Successively, the steps of sampling and/or grouping the neighborhood of the points sampled, then grouping these points are repeated and encoded by convolution layers to create maps of the parameters obtained.

The method according to the invention advantageously makes it possible to create a function retaining the symmetry of all the points as an input of the network with that as an output of the network. Thus, the application of the neural network $CNN_1$ to a non-connected, non-oriented graph can be ensured by implementing this function maintaining symmetries. This function ensures independence of this step with respect to the scheduling of points as an input. This function also allows the implementation of auto-encoders within the regression processing.

Example of a Parametric Model

All parameterized models can be obtained from a generic parametric model. One interest of such a model is to be able to generate a plurality of poses of a human body from a parameterization of the joints and shape parameters. When a parameterized model is in a given posture, it is possible to generate an infinite number of partial views that all correspond to a given viewpoint on the parameterized body model.

A feature of such a body model is that it can be modeled by a set of joints each comprising at least one rotation and one position. Rotation of a joint can be defined by at least one angle. The position of the joint can be associated with at least one position of at least one point in the graph or several points in the same graph. According to another example, the position of the joint is obtained from an operation combining different positions of the graph for example to generate a new position of a new point. This new point can for example be a barycenter of a subset of points in the graph. Shape parameters can be parameterized to define overall body shape parameters.

The set of given configurations of a set of joints in position and rotation allows a given pose or posture of the body model to be defined. Thus, it is possible to generate a plurality of poses of the body model.

According to one embodiment, the parametric modeling of the human body is a meshed network of points. Each parameterized joint generates a configuration associating a subset of points of the meshed network of points.

According to the latter example, 24 joints can be defined from 72 rotation parameters, each joint is associated with 3 rotations. This parametric model MOD_P can also comprise 3 overall rotations. A subset of joints can be extracted to perform an embodiment of the invention, such as the wrist, elbow, etc.

Each joint may also comprise a set of shape parameters such as the wrist width, the wrist length, etc.

According to one example embodiment, a principal component analysis function, known as PCA, makes it possible to extract principal shape parameters. By way of example, the size of an individual, the thickness of the ventral zone, the body size, the size of the pelvis, etc. can be configured to pre-set a set of local parameters related to a plurality of joints.

The parametrizing of a body may comprise a plurality of vectors defining a shape and an angle. By way of example, this could be the ankle, waist, arm, etc. A general configuration makes it possible to obtain a given silhouette or build of the body that can be parameterized.

Other parameterizable body models may be used with the method of the invention.

According to one example, a body model MOD_S can be obtained from a configuration of a parametric model MOD_P with the following parameters:

Overall translation of the model in space: Tx, Ty, Tz, that is 3 parameters;

Overall rotation of the model in space: Rx, Ry, Rz, that is 3 parameters;

Rotation angles of each joint, for example by using a parametric model comprising 24 or more joints each having 3 rotation parameters: Rxi, Ryi, Rzi defining a total of 72 parameters;

Shape coefficients, for example by using a parametric model comprising 20 shape coefficients. These influence the shape of the human body.

Possibly, parameters comprise dynamic shape coefficients that influence the position of tissues according to motions.

In this example, 88 parameters can be determined to generate a human body model.

Joints can be defined at points of interest in the human body such as knees, wrists, elbows, ankles, neck, etc. Shape coefficients may comprise parameters such as waist circumference, wrist circumference, neck girth, shoulder width, hip width, head circumference, etc.

Other examples of parameterization may be implemented with the method or system of the invention.

Virtual Reality Headset

According to one embodiment, the system 1 comprises a virtual reality headset 6 into which a 3D display is integrated. The display is capable of generating a 3D image in real time from digital data derived from a video stream.

Among the data delivered, the invention makes it possible to generate data of the model of the body MOD_P of the individual in real time. The body model is reconstructed from at least one partial view $VP_1$ calculated in real time by at least one optical device 3. Thus, depending on some applications, the individual 9 wearing the virtual reality headset 6 can visualize his/her own three-dimensional model moving in space. According to other applications, which can be combined with this first application, other users connected to a data network can receive the video stream generated by the system 1 used by the individual 9 in order to broadcast in another virtual reality headset 6 images of the digital avatar of the individual 9 in real time.

Figure 5:
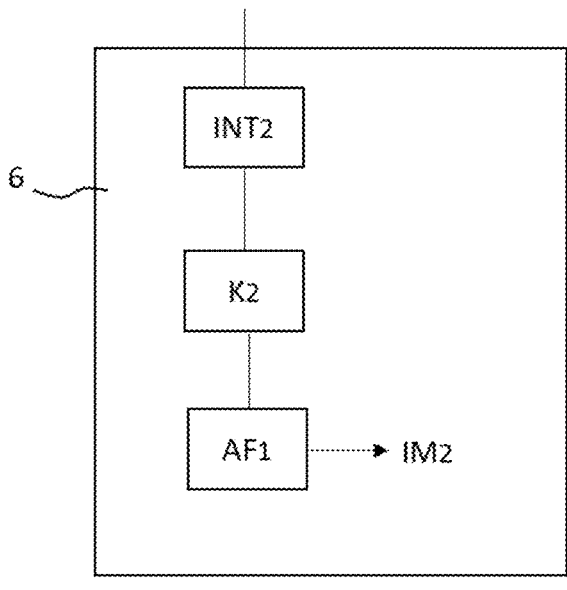
FIG. 5: an embodiment of a functional representation of a virtual reality headset of the invention.
Figure 6:
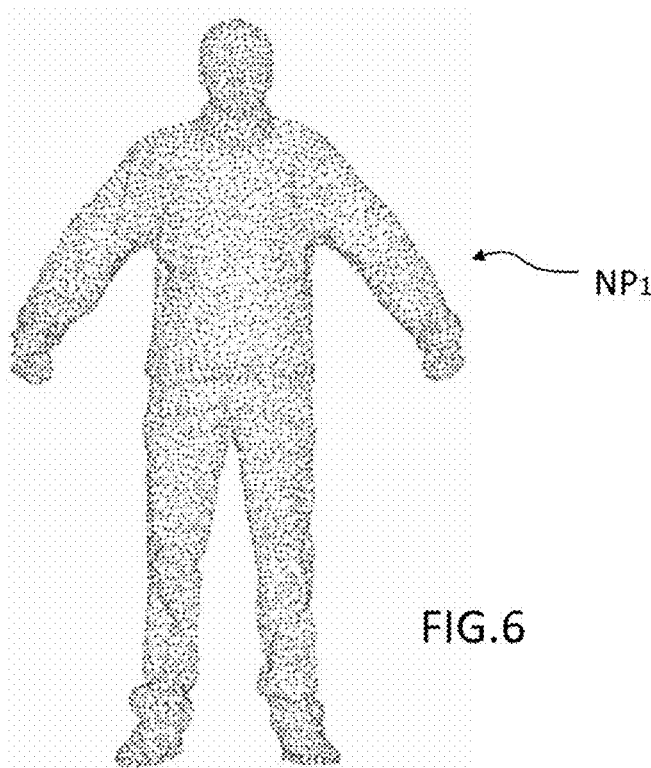
FIG. 6: an embodiment of a point cloud of an individual generated from a partial view of an individual.

FIG. 5 represents an example functional embodiment of a virtual reality headset 6. This example represents a virtual reality headset 6 comprising an interface $INT_2$ for receiving data from at least one optical device 31 or from an outer housing collecting data from at least one optical device 31 in order to generate a body model MOD_S which will itself be transmitted to the virtual reality headset 6. The virtual reality headset 6 further comprises a calculator $K_2$ for processing the body model MOD_S or the digital avatar in order to produce a virtual 3D image $IM_2$ in the display $AF_1$ of the virtual reality headset 6.

According to one embodiment, the frame of reference $R_3$ of the virtual reality headset 6 is referenced in space for example as $R_0$. The virtual reality headset 6 may be equipped with an inertial unit delivering acceleration and orientation indications in order to generate a virtual reality context consistent with the head motions of the individual 9. The method and system of the invention make it possible to corroborate the head motions of the individual 9 with the images of the body model produced. Analysis of data from the virtual reality headset and data from electronic equipment producing body models in real time can be used to:

Correct errors detected between the two measurements;

Calibrate the virtual reality headset with the optical devices,

Obtain additional data describing motions of the body model.

According to one example, the virtual reality headset 6 is provided with at least one inner 3D camera in order to reconstitute a 3D model of the part masked by the virtual reality headset 6. These images can be merged with the body model MOD_S produced by the invention.

According to one embodiment, the virtual reality headset 6 is provided with an optical device of type 31, that is, capable of constructing a 3D image either of at least one individual other than the wearer 9 of virtual reality headset 6 located facing the latter, or of a part of the body of the individual 9 wearing the headset. One interest is to make it possible to reconstruct a body model seen from the individual 9.

This optical device 31 can be used alone or in combination with another optical device arranged for example in a room.

The invention claimed is:

1. A method for generating at least one human body model comprising:

acquiring at least one partial view of at least one human body at least one individual the at least one partial view defining a 3D image from at least one optical device arranged in a position of space, and generating at least one 3D human body model of said at least one human body of the at least one individual from the 3D image by applying a trained neural network said neural network being trained to generate the at least one 3D human body model of said at least one human body of the at least one individual from at least one 3D input image of the at least one human body of the at least one individual, said training of the neural network being performed from a data set comprising a plurality of partial views of human bodies each representing a three-dimensional surface, each of the partial views used for training the neural network being generated from a three-dimensional mesh.

2. The method according to claim 1, wherein a regression model of the neural network is supervised by data describing three-dimensional meshes of partial view of a human body.

3. The method according to claim 1, wherein each of the partial views used for training the neural network is generated from a structured, ordered and connected three-dimensional mesh.

4. The method according to claim 1, wherein a human body parametric model is configured to generate a three-dimensional mesh of a human body, said three-dimensional mesh being used to generate a partial view of a human body in order to train the neural network.

5. The method according to claim 1, further comprising sampling the three-dimensional mesh to generate a point cloud, each point cloud defining a partial view of a human body in order to train the neural network.

6. The method according to claim 1, further comprising generating a 3D image comprising a 2D image and a depth map from the three-dimensional mesh, each 2D image and depth map defining a partial view of a human body in order to train the neural network.

7. The method according to claim 4, wherein the human body parametric model is parameterizable from shape and joint coefficients defining a given configuration of a human body model.

8. The method according to claim 1, wherein each partial view acquired comprises a 2D image with which is combined digital information for constructing a three-dimensional representation of a surface in space.

9. The method according to claim 1, wherein each partial view acquired defining a 3D image is encoded in the form of a point cloud to define inputs of the neural network.

10. The method according to claim 9, wherein the inputs of the neural network are defined by input vectors, each input vector comprising the coordinates of a point of the encoded point cloud and at least one piece of data encoding a local shape descriptor of the point cloud calculated at said point.

11. The method according to claim 1, further comprising at least twice acquisitions at least two partial views of an individual each defining a 3D image from at least two optical devices arranged in two positions of space, each 3D image acquired defining an input of the trained neural network to generate from the input 3D images a 3D model of said individual.

12. The method according to claim 11, further comprising generating an overall 3D image in real time of each partial view acquired of said individual from said 3D images acquired.

13. The method for generating at least one human body model as claimed in claim 1, wherein the 3D model of said at least one body of the individual comprising a 3D mesh.

14. The method as claimed in claim 1, comprising:
generating a digital avatar from the body model generated, said generation of the avatar being performed within a digital image defining a virtual context from second data acquired from a data interface,
displaying the avatar and the virtual context.

15. A system for generating a human body model comprising:
an image acquisition system comprising at least one optical device arranged in a position of space, the image acquisition system being configured to acquire at least one partial view of an individual defining a 3D image from said optical device;
calculation means for implementing the method of claim 1.

16. The system according to claim 15, wherein each optical device comprises:
at least two infrared cameras and/or;
at least one color camera and/or;
at least one pair of color cameras configured to generate 3D images by stereoscopy and/or;
at least three cameras comprising two infrared cameras and one color camera and/or;

at least one infrared projector projecting a pattern and two infrared cameras capturing said pattern projected on the surface of a human body,
at least one light projector projecting patterns of structured light and at least one camera capturing said patterns; and/or
a time-of-flight camera and/or;
a laser transceiver device.

17. The system as claimed in claim 15, the system further comprising:
a first communication interface for transmitting first data in real time, comprising at least said 3D human body model, to a second communication interface;
a virtual reality headset comprising the second communication interface to receive the first data transmitted from the communication interface, said virtual reality headset comprising a calculator to generate a 3D virtual image in real time comprising a digital avatar generated from the data of the 3D human body model.

18. A method for generating at least one human body model comprising:
acquiring at least one partial view of at least one individual defining a 3D image from at least one optical device arranged in a position of space, and
generating at least one human body model by applying a trained neural network to generate at least one 3D model of said at least one body of the individual from at least one 3D input image, said training of the neural network being performed from a data set comprising a plurality of partial views of human bodies each representing a three-dimensional surface, each of the partial views used for training the neural network being generated from a three-dimensional mesh,
wherein a human body parametric model is configured to generate a three-dimensional mesh of a human body, said three-dimensional mesh being used to generate a partial view of a human body in order to train the neural network; the human body parametric model being parameterizable from shape and joint coefficients defining a given configuration of a human body model.

19. A system for generating a human body model comprising:
an image acquisition system comprising at least one optical device arranged in a position of space, the image acquisition system being configured to acquire at least one partial view of an individual defining a 3D image from said optical device;
calculation means for implementing the method of claim 18.

20. A method for generating at least one human body model comprising:
acquiring at least one partial view of at least one individual defining a 3D image from at least one optical device arranged in a position of space, and
generating at least one human body model by applying a trained neural network to generate at least one 3D model of said at least one body of the individual from at least one 3D input image, said training of the neural network being performed from a data set comprising a plurality of partial views of human bodies each representing a three-dimensional surface, each of the partial views used for training the neural network being generated from a three-dimensional mesh,
wherein each partial view acquired defining a 3D image is encoded in the form of a point cloud to define inputs of the neural network, wherein the inputs of the neural network are defined by input vectors, each input vector comprising the coordinates of a point of the encoded point cloud and at least one piece of data encoding a local shape descriptor of the point cloud calculated at said point.

21. A system for generating a human body model comprising:

an image acquisition system comprising at least one optical device arranged in a position of space, the image acquisition system being configured to acquire at least one partial view of an individual defining a 3D image from said optical device;

calculation means for implementing the method of claim 20.

* * * * *